(12) United States Patent
Weinmann

(10) Patent No.: US 6,969,969 B2
(45) Date of Patent: Nov. 29, 2005

(54) CIRCUIT ARRANGEMENT FOR THE ACTUATION OF AN ELECTRIC-MOTOR DRIVE, IN PARTICULAR A PUMP DRIVE, IN A LARGE DOMESTIC APPLIANCE

(75) Inventor: Martin Weinmann, Bad Waldsee (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 0 days.

(21) Appl. No.: 10/620,735

(22) Filed: Jul. 16, 2003

(65) Prior Publication Data
US 2004/0012350 A1  Jan. 22, 2004

Related U.S. Application Data

(63) Continuation-in-part of application No. 10/354,650, filed on Jan. 30, 2003, now abandoned.

(30) Foreign Application Priority Data
Feb. 21, 2002 (DE) ................................ 102 07 232

(51) Int. Cl.[7] ................................ H02P 5/28
(52) U.S. Cl. ................ 318/811; 318/34; 318/47; 318/807
(58) Field of Search ................ 318/811, 11, 34, 318/47, 807, 818, 751, 725, 727, 794, 795, 318/803, 805, 785; 388/907.2, 908, 937

(56) References Cited

U.S. PATENT DOCUMENTS

| 4,670,693 A | 6/1987 | Kazami et al. |
| 4,698,938 A * | 10/1987 | Huber .................... 49/138 |
| 6,121,749 A * | 9/2000 | Wills et al. .............. 318/811 |
| 6,301,743 B1 * | 10/2001 | Cloud et al. .............. 15/339 |

FOREIGN PATENT DOCUMENTS

| DE | 331317 A1 | 10/1984 |
| FR | 2 711 862 | 5/1995 |
| FR | 2 758 668 | 7/1998 |
| JP | 05049780 A | 3/1993 |
| JP | 10-85489 | 4/1998 |
| JP | 2001129293 A | 5/2001 |
| JP | 2001-276485 | 10/2001 |

* cited by examiner

Primary Examiner—Karen Masih
(74) Attorney, Agent, or Firm—Scully, Scott, Murphy & Presser

(57) ABSTRACT

A large domestic appliance has main and auxiliary drives (17, 24) thereof supplied from the same dc voltage intermediate circuit (19) which is provided only once, by way of change-over switch sets (12), by half-bridge circuits (21, 21'). For that purpose a frequency converter (15) with its bridge circuit (21) for the main drive (17) is switched over in single-pole or multiple mode to the rotary field motor (23, 25) of the auxiliary drive (24) by way of a change-over switch set (12) connected in its output-side motor lines (13); or in the frequency converter (15) two half-bridge circuits (21, 211) which are associated with the main and the auxiliary drives (17, 24) are operated in parallel from the dc voltage intermediate circuit (19).

2 Claims, 2 Drawing Sheets

Figure 1:
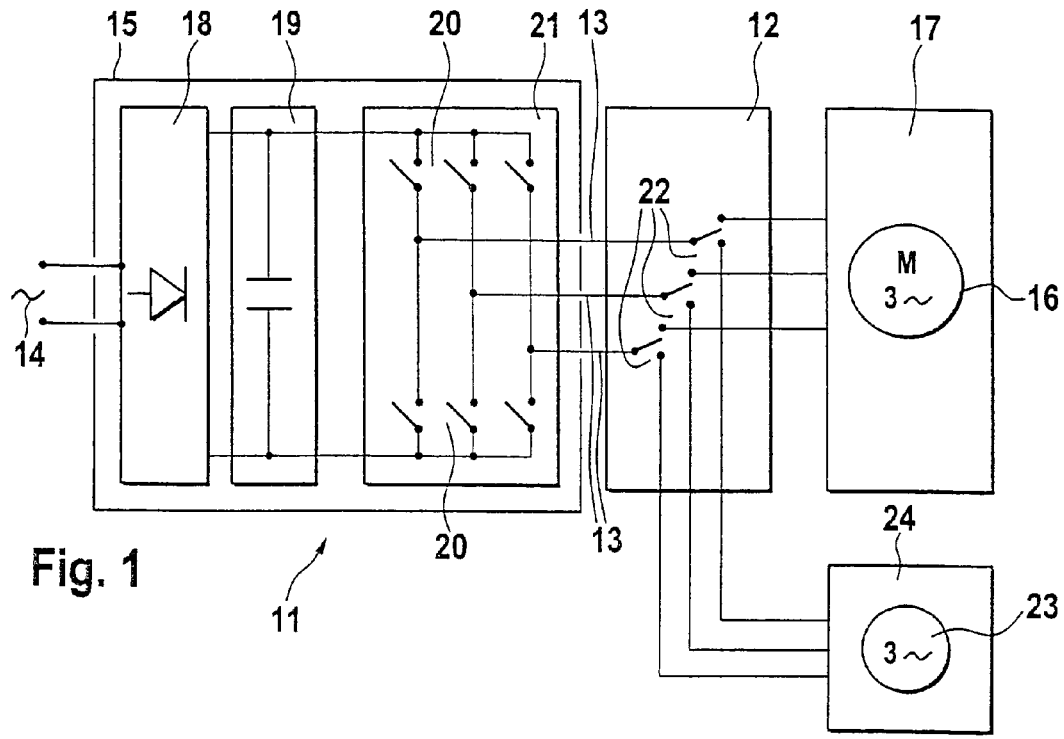

CIRCUIT ARRANGEMENT FOR THE ACTUATION OF AN ELECTRIC-MOTOR DRIVE, IN PARTICULAR A PUMP DRIVE, IN A LARGE DOMESTIC APPLIANCE

CROSS REFERENCE TO RELATED PATENT APPLICATION

This application is a continuation-in-part patent application of Ser. No. 10/354,650; filed on Jan. 30, 2003.

BACKGROUND OF THE INVENTION

1. Field of the Invention

The invention concerns a circuit arrangement for the actuation of an electric motor main drive which is operated from a frequency converter with a controlled bridge circuit in a large domestic appliance which is also equipped with an auxiliary drive.

2. Discussion of the Prior Art

In order to be able to adjust a rotary field which rotates independently of the fixed mains frequency and the mains voltage, for the operation of synchronous motors and asynchronous motors, it is usual to employ a circuit arrangement of the general kind set forth in large domestic appliances, in particular; for example, for actuation of the drive motor for the washing drum in a washing machine or the circulating pump for the dishwashing agent circuit in a dishwashing machine, as the main drives thereof. In that situation the field coil of the respective motor is operated from the mains rectifier with a dc voltage intermediate circuit connected downstream thereof, by way of a frequency converter half-bridge arrangement which can be switched over in multiple mode. Rotary field control as a consequence of co-ordinate actuation of the switches in respect of repetition frequency, duration and mutual phase position is usually effected from a microprocessor in accordance with a program which is predetermined in accordance with the motor characteristic and on which present items of control and regulating information are superimposed in accordance with an operating program which is currently to be executed.

Besides such a main drive, a large domestic appliance is usually to be found to have an auxiliary drive of lower power, for additional functions which are only temporarily required, such as for example for filling or emptying the working chamber with an uninfluenced delivery, which for cost reasons is usually operated directly from the single-phase mains, without expensive rectifier control systems. This therefore involves accepting the fact that the mode of operation of the auxiliary drive cannot be optimized.

SUMMARY OF THE INVENTION

The object of the present invention is to make the use of auxiliary drives more flexible without an unreasonably high increase in technical complication and expenditure and thereby to optimize same from the operational point of view or even to be able to open therewith entirely new operating functions.

In accordance with the invention that object is attained in that, in accordance with the most important features recited in the main claim, the dc voltage intermediate circuit now provided at the mains for the feed to the frequency converter now supplies both the main drive and also an auxiliary drive. In that respect it can be provided that disposed in at least one of the motor feed lines from the frequency converter bridge circuit to the main drive there is a change-over switch which in this respect switches over the bridge circuit from the main drive and to the auxiliary drive. Then, instead of the previous main drive, the auxiliary drive is henceforth connected to the converter and can therefore be actuated without further additional complication and expenditure similarly to the main drive previously from the same frequency converter bridge circuit in order for example to vary the rotary speed thereof and under some circumstances also to provide a reversal in the direction of rotation. It is, however, also possible to operate the main and the auxiliary drive in parallel, possibly even at different speeds, insofar as two bridge circuits (one for each motor) are fed in parallel from the intermediate circuit. With regard to the foregoing bridge circuits, this relates to a full bridge circuit of conventional type for the motor of the main drive, into which there, however, also now engages also the auxiliary drive in a single-phase, and also an additional partial bridge circuit for the other phases of the auxiliary drive.

This control capability for also for the auxiliary drive affords entirely new operational options such as a variation in or even a reversal in the direction of a delivery pressure which is produced by way of the auxiliary drive in order thereby to liberate for example sieves and filters but also the pump impeller itself quickly and effectively from washing fluff and similar impurities, which have become caught therein. In addition a reversal in flow which is produced by way of the pump, by means of water switching devices and similar pressure pulse switches in a pressure line downstream of the pump permits specifically controlled actuation of different functions of the appliance without intervention in the electrical operational control of the operating program. Particularly in this connection it is desirable for motor feed parameters of the frequency converter such as output voltage, current or electrical power to be evaluated as a measurement in respect of prevailing hydraulic or mechanical parameters in the system, for example in regard to the delivery pressure of a pump, in order to be able to register and possibly even correct the implementation of the function which is currently initiated.

Therefore, so that not only the main drive of a large domestic appliance but also the auxiliary drive thereof can be operated at any event variably and if possible even in an optimized fashion, without having to substantially increase the overall control complication and expenditure required for that purpose in the appliance, in accordance with the invention the dc voltage intermediate circuit which is present for the main drive is also made available for operation of the auxiliary drive. In particular a frequency converter which is fed from the intermediate circuit can be switched over in single-pole or multiple mode by way of a change over switch set from the main drive to the rotary field motor of the auxiliary drive. That permits additional flow-dependent functions in the appliance such as, for example, flushing the pump free from washing threads and fibers which have been washed into the pump, or switching over in functions through water filters or separators and the like fluid pressure switches, through the frequency converter which is designed for the main drive, by way of control of the rotational speed or the direction of rotation of the auxiliary drive.

With regard to further particular operating options which are also afforded by virtue of a variable delivery pressure or a delivery direction, which can be switched over, of a pump driven by an electric motor, and which therefore can be particularly advantageously implemented with a switching-over motor control arrangement in accordance with the invention, attention is directed in terms of the full content thereof to the applicants' own earlier German Patent Application DE 1 01 54 630.0, entitled "Electric-Motor Operated Pump for a Dishwashing Machine", filed on Nov. 7, 2001, the disclosure of which is incorporated herein by reference.

BRIEF DESCRIPTION OF THE ACCOMPANYING DRAWINGS

Figure 2:
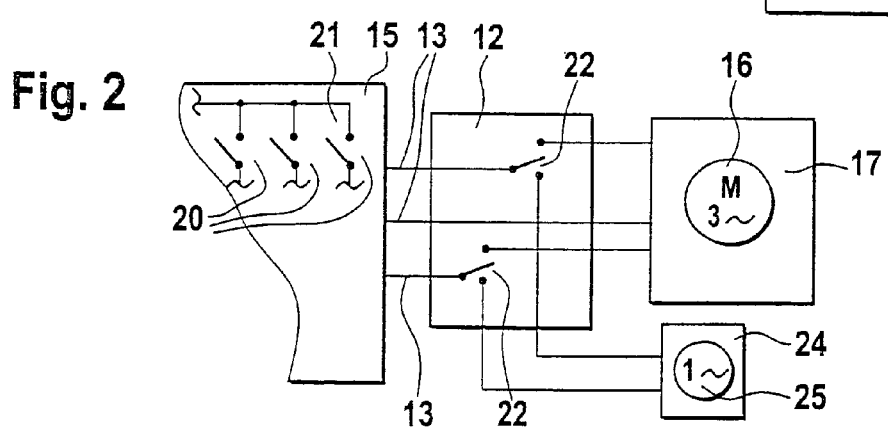
Figure 3:
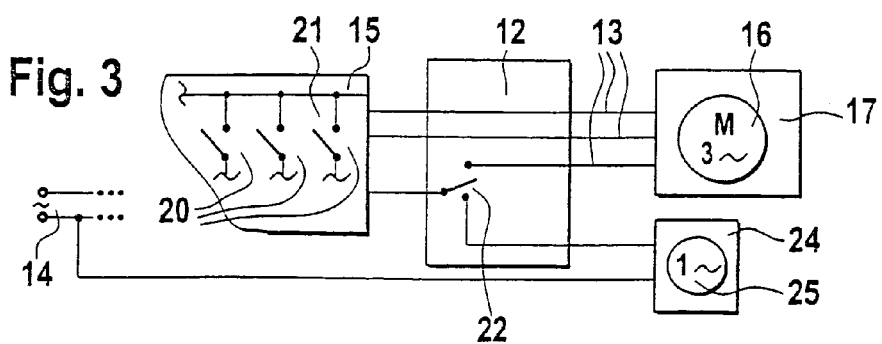
Figure 4:
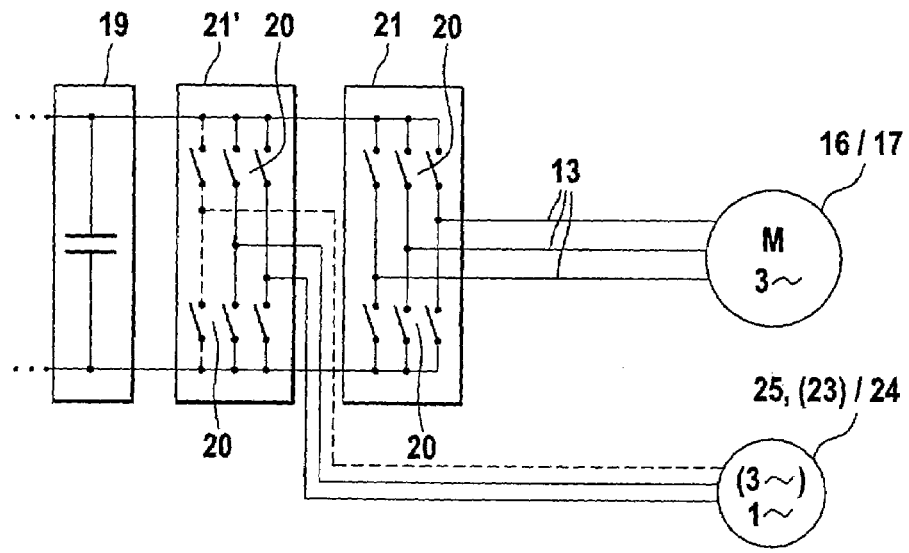
Figure 5:
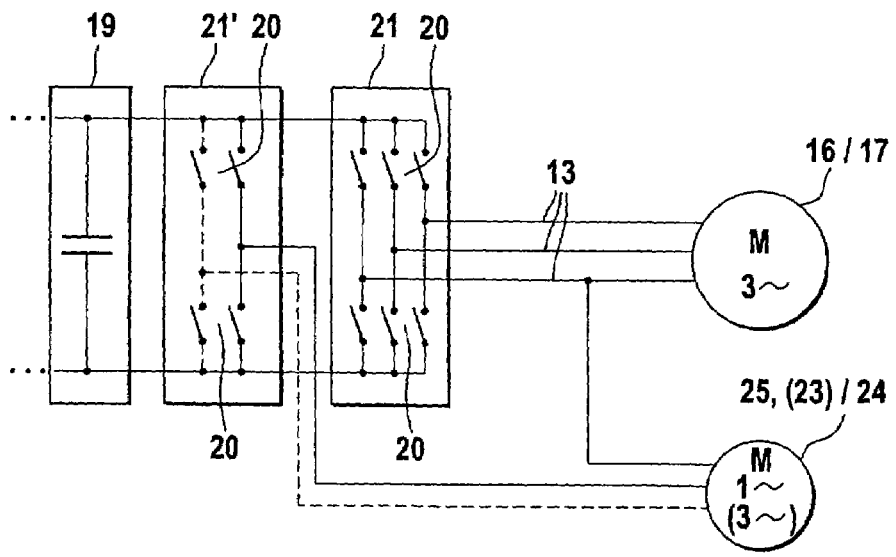

In regard to additional developments and further advantages of the invention reference is therefore made to the description hereinafter of possible circuit configurations, as diagrammatically shown in the drawing in which:

FIG. 1 shows a three-pole change-over switching arrangement in the motor feed lines at the output of a frequency converter in order to be able to change over from the operation of a main drive to the operation of an auxiliary drive with the same control options, FIG. 2 shows a two-pole change-over switching arrangement for bringing into operation a single-pole auxiliary drive, FIG. 3 shows a single-pole change-over switching arrangement for bringing into operation a single-pole auxiliary drive which is rotary field-synchronous with the feeding mains frequency, FIG. 4 shows a parallel operation of a three-phase main drive and a three-phase or single-phase auxiliary drive with separate bridge circuits downstream of a common dc voltage intermediate circuit, and FIG. 5 shows in a modification of the additional bridge circuit in FIG. 4, a possibility in a parallel operation of a three-phase main drive and a single-phase or three-phase auxiliary drive with different rotary field frequencies, with the employment of a partial bridge circuit for a single-phase auxiliary drive which is connected to the bridge circuit to the main drive.

DETAILED DESCRIPTION OF PREFERRED EMBODIMENTS

The circuit arrangement 11 diagrammatically shown in FIG. 1 of the drawing substantially comprises a change-over switch set 12 in the three motor feed lines 13 from a frequency converter 15 fed from the domestic mains 14 to an asynchronous motor 16 or the like rotary field motor as the three-phase main drive 17 in a large domestic appliance (not shown), for example, for driving the drum of a washing machine or the washing solution circulating pump of a dishwasher. In the frequency converter 15 a dc voltage intermediate circuit 19 which essentially comprises capacitors of high capacitance is charged up from a full-wave mains rectifier 18 in a Graetz circuit. The output voltage of the intermediate circuit 19 is connected to the three motor feed lines 13 to the main drive 17 by way of pairs, of alternatingly switched on switching sections 20 of a bridge circuit 21 consisting of three parallel half-bridges with alternating polarities and at variable durations. Control over the switching sequences in the frequency converter 15 through a programmed processor is omitted from the drawing for the sake of enhancing the clarity thereof, especially since those features pertain to the state-of-the art and are not concerned with the present invention.

In the case shown in FIG. 1, the output of the inverter bridge circuit 21 in the frequency converter 15 is switched by the change-over switch set 12 arranged in accordance with the invention in the motor feed lines 13, with in this case by way of example three change-over switches 22, from the three-phase motor 16 of the main drive 17 to an asynchronous or synchronous rotary field motor 23, which in this case is also a three-phase motor, of an auxiliary drive 24. That change-over switching procedure causes the main drive 17 to be taken out of operation and the auxiliary drive 24 to be brought into operation in order for example to change over from driving a washing drum to driving an emptying pump. Motor control for the auxiliary drive 24, without in this respect requiring additional circuitry measures, is effected, like that of the main drive 17, from the same frequency converter 15, now under the influence of a control program designed for operation of the auxiliary drive 24 and for the timed sequence in the actuation of the switching sections 20. In particular, as in regard to the main drive 17, it is also possible in regard to the auxiliary drive 24 to infer from its feed parameters which are currently measured on the motor feed lines 13 (voltages and currents, or the product thereof as electrical power draw, not separately represented in the main circuit diagram) regarding the actual mechanical or hydraulic loadings in the fluid system behind the auxiliary drive 24 can be made assumptions, and as a result there can be optimized with regard thereto, both its power consumption as well as its effectiveness.

In the embodiment of the circuitry shown in FIG. 2 the change-over switch set 12 in the motor feed lines 13 comprises only two change-over switches 22 for switching over from the main drive 17 to an auxiliary drive 24 with here, for example, a single-phase synchronous or the like rotary field motor 25, which can also relate to a capacitor-asynchronous motor. Like previously with regard to the main drive 17, this auxiliary drive 24 can also be supplied by way of the single rectifier bridge circuit 21 which is provided downstream of the intermediate circuit 19, with a variable-frequency rotary field, for example, in order to cause it to start-up generally smoothly and then to vary the operating speed of rotation.

In the modification shown in FIG. 3, the change-over switch set 15, in contrast with FIG. 2, possesses only one change-over switch 22, since now only one of the two motor feed lines 13 is to be switched over from the main drive 17 to the auxiliary drive 24, while the second feed line thereof is fixedly connected to a pole of the single-phase mains supply voltage 14. The inverter bridge circuit 21 which is designed primarily for control of the main drive 17 thus again also serves for actuation of a single-phase motor 25; that minimized topology with its reduced change-over switch set 12 is at any event still suitable for control in respect of voltage and direction of rotation of the synchronous motor 25 in the auxiliary drive 24 if it is operated in the steady-state condition at the frequency of the domestic mains 14. The limited rotary speed control of a capacitor asynchronous motor can also be implemented here.

In the configuration shown in FIG. 4, in contrast with the foregoing, the arrangement entirely eliminates switching over between the main and the auxiliary drives 16–24 in order to be able to operate both simultaneously. For this purpose, in this case the dc voltage intermediate circuit 19 in the frequency converter 15, in parallel with the half-bridge circuit 21 for the main drive 18, supplies a further part-or half-bridge circuit 21' for a selectively single-phase or three-phase motor 25, or respectively 23, in the auxiliary drive 24. By means of the broken-line there is represented the fact that for the case of a three-phase (instead of a single-phase) motor 23 of the auxiliary drive 24, in the bridge circuit 21' after the intermediate circuit 19, there are then associated there half-bridges with the three phases (instead of two half-bridges with the motor feed lines 13 of a single-phase motor 25).

A topology as shown in FIG. 5 finally permits a parallel operation of the main and the auxiliary drives 16/25 or 16/23, even with differing frequencies, in effect, even with rotary fields rotating at different speeds. The only condition is that the sum of the two motor voltages (16+23/25) does not exceed the dc voltage at the output of the intermediate circuit 19. Because, for example, the drum main drive 17 of a washing machine is fed at a low motor voltage over relatively long periods of time for a low speed of rotation for washing, in the meantime a sufficient voltage reserve is available for the simultaneous operation of an auxiliary drive 24. For instance, the single-phase motor 25 thereof is connected with one of its two feed lines 13 to one of the half-bridges of the three-phase bridge circuit 21 for the main drive-motor 16, and with its second feed line 13 to the single required half-bridge of the partial-bridge circuit 21' to the auxiliary drive-motor 25. In the drawing there is again considered through broken lines, that for the auxiliary drive-motor 23 there is also applicable a three-phase motor, for which there is available a further half-bridge in the partial-bridge circuit 21' for the third motor feed line 13.

What is claimed is:

1. A circuit arrangement for the actuation of an electric-motor main drive (17) in a large domestic appliance operated from a frequency converter with a controlled bridge circuit (21), said domestic appliance being also equipped with an auxiliary drive (24), said auxiliary drive having bridge circuits (21, 21') which are supplied from a unitary dc-voltage intermediate circuit (19) as is the main drive (17);
   characterized in that said auxiliary drive (24) comprises a single-phase motor having one motor supply line thereof connected to an arm of the bridge circuit (21) for the main drive (17) and another motor supply line thereof connected to a single arm of the bridge circuit (21') for the auxiliary drive (24) which is operated in parallel therewith.

2. A circuit arrangement according to claim 1, characterized in that for a parallel operation of said main drive (17) and said auxiliary drive (24) at different rotary field frequencies, the motors of said drives are designed so that the sum of their two motor voltages does not exceed the voltage at the output of the dc-voltage intermediate circuit (19).

* * * * *